(12) United States Patent
Esseghir et al.

(10) Patent No.: US 10,908,376 B2
(45) Date of Patent: Feb. 2, 2021

(54) CONDUITS WITH CAPILLARY STRUCTURES

(71) Applicant: Dow Global Technologies LLC, Midland, MI (US)

(72) Inventors: Mohamed Esseghir, Collegeville, PA (US); Chester J. Kmiec, Collegeville, PA (US); Wenyi Huang, Midland, MI (US); Thomas J. Parsons, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/475,289

(22) PCT Filed: Jan. 17, 2018

(86) PCT No.: PCT/US2018/014037
§ 371 (c)(1),
(2) Date: Jul. 1, 2019

(87) PCT Pub. No.: WO2018/144222
PCT Pub. Date: Aug. 9, 2018

(65) Prior Publication Data
US 2019/0339473 A1  Nov. 7, 2019

Related U.S. Application Data

(60) Provisional application No. 62/452,673, filed on Jan. 31, 2017.

(51) Int. Cl.
*H02G 1/08* (2006.01)
*G02B 6/44* (2006.01)
(Continued)

(52) U.S. Cl.
CPC ............. *G02B 6/4459* (2013.01); *G02B 6/46* (2013.01); *H01B 7/184* (2013.01); *H02G 1/08* (2013.01)

(58) Field of Classification Search
CPC ........ G02B 6/4459; G02B 6/46; H01B 7/184; H02G 1/08
(Continued)

(56) References Cited

U.S. PATENT DOCUMENTS 3,240,233 A * 3/1966 Johnston ................... F16C 1/26
138/108
4,688,890 A * 8/1987 Demeo ................ G02B 6/4463
138/108
(Continued)

FOREIGN PATENT DOCUMENTS

| DE | 8901210 U1 | 3/1989 |
|---|---|---|
| DE | 4133415 A1 | 4/1993 |

(Continued)

OTHER PUBLICATIONS

International Search Report and Written Opinion of the International Searching Authority for international Application No. PCT/US2018/014037 dated Apr. 30, 2018, 10 pages.

*Primary Examiner* — Timothy J Thompson
*Assistant Examiner* — Michael F McAllister

(57) ABSTRACT

The present disclosure provides a conduit (10). The conduit (10) includes (i) an annular wall (66) composed of a polymeric material, the annular wall (66) defining an annular passageway; (ii) a plurality of channels (68) extending along a length of an inner surface (62) of the annular wall (66); and (iii) a slip material located in the channels (68), the slip material forming a capillary structure (70) in the channels (68), and the capillary structures (70) protruding radially inward from the annular wall (66).

14 Claims, 5 Drawing Sheets

(51) Int. Cl.
*G02B 6/46* (2006.01)
*H01B 7/18* (2006.01)

(58) Field of Classification Search
USPC .......................................................... 174/68.1
See application file for complete search history.

(56) References Cited

U.S. PATENT DOCUMENTS

| | | | | |
|---|---|---|---|---|
| 4,892,442 | A * | 1/1990 | Shoffner | G02B 6/4459 405/183.5 |
| 5,154,869 | A * | 10/1992 | Bergmann | G02B 6/4459 264/167 |
| 5,789,708 | A * | 8/1998 | Cocito | G02B 6/4459 174/68.1 |
| 9,177,694 | B2 * | 11/2015 | Kajiwara | B29C 43/18 |
| 2011/0100671 | A1 * | 5/2011 | Seraj | H02G 15/1813 174/68.1 |

FOREIGN PATENT DOCUMENTS

| | | | |
|---|---|---|---|
| EP | 0221481 | A1 | 5/1987 |
| EP | 0732789 | A1 | 9/1996 |

* cited by examiner

CONDUITS WITH CAPILLARY STRUCTURES

BACKGROUND

The present disclosure is directed to conduits having capillary structures.

A longstanding problem in the cable installation process is the high tension that arises as cables are pulled into and through a conduit. The main cause of high tension during installation is high coefficient of friction (COF) materials included in conduits and/or cable jackets. Attempts have been made to incorporate low COF materials into conduits, such as through a blending process. However, incorporation of low COF materials into conduits through a blending process has been found to compromise the mechanical properties of the conduit. Further, this process requires a high load of low COF materials, which are expensive. Attempts have also been made to coextrude low COF materials in the inner surface of a conduit. However, coextrusion of a layer of low COF materials typically requires a tie layer to create a bond between the conduit material and the coextruded low COF material. This process also requires a high load of low COF materials.

The art recognizes the need for a conduit that includes low COF materials, the conduit reduced tension during cable installation, without compromising the mechanical properties of the conduit. The art also recognizes the need for a conduit that includes a small load of low COF materials such that the conduit is less expensive than those produced via a blending process.

SUMMARY

The present disclosure provides a conduit. In an embodiment, the conduit includes:

(i) an annular wall composed of a polymeric material, the annular wall defining an annular passageway;

(ii) a plurality of channels extending along a length of an inner surface of the annular wall; and (iii) a slip material located in the channels, the slip material forming a capillary structure in the channels, and the capillary structures protruding radially inward from the annular wall.

DEFINITIONS AND TEST METHODS

Figure 1:
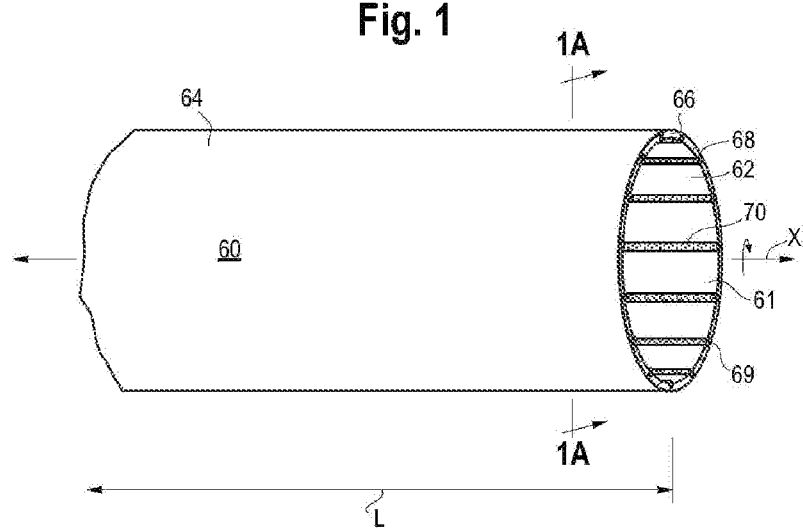
FIG. 1 is a perspective view of a conduit in accordance with an embodiment of the present disclosure.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

Coefficient of Friction (COF) is measured according to ASTM D1894. The substrate employed for COF determinations is DOW HDPE DGDB-2480 NT, which is a high-density polyethylene commercially available from The Dow Chemical Company, Midland, Mich., USA.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "conductor" is one or more wire(s), or one or more fiber(s), for conducting heat, light, and/or electricity. The conductor may be a single-wire/fiber or a multi-wire/fiber and may be in strand form or in tubular form. Nonlimiting examples of suitable conductors include carbon and various metals, such as silver, gold, copper, and aluminum. The conductor may also be optical fiber made from either glass or plastic. The conductor may or may not be disposed in a protective sheath. A "cable" is a conductor whereby two or more wires, or two or more optical fibers, are bound together, optionally in a common insulation covering. The individual wires or fibers inside the covering may be bare, covered, or insulated. Combination cables may contain both electrical wires and optical fibers. The cable can be designed for low, medium, and/or high voltage applications. The cable may be a communication cable with optical fiber, metal wire (such as copper wire), and combinations thereof. Nonlimiting examples of cable designs are illustrated in U.S. Pat. Nos. 5,246,783; 6,496,629; and 6,714,707, each incorporated herein by reference.

Density is measured in accordance with ASTM D792. The result is recorded in grams (g) per cubic centimeter (g/cc or g/cm$^3$).

An "ethylene-based polymer" is a polymer that contains more than 50 mole percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A nonlimiting example of a suitable HDPE is CONTINUUM™ DGDA-2490 KB, available from The Dow Chemical Company.

A "jacket" is a coating on the conductor. The jacket may be in direct contact with the conductor. Alternatively, one or more intervening layers may be present between the jacket and the conductor.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.916 g/cc to 0.925 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Low density polyethylene" (or "LDPE") is an ethylene homopolymer, or an ethylene/α-olefin copolymer comprising at least one $C_3$-$C_{10}$ α-olefin, or a $C_3$-$C_4$ α-olefin, that has a density from 0.915 g/cc to 0.925 g/cc and contains long chain branching with broad molecular weight distribution (MWD). LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Medium density polyethylene" (or "MDPE") is an ethylene homopolymer, or an ethylene/α-olefin copolymer comprising at least one $C_3$-$C_{10}$ α-olefin, or a $C_3$-$C_4$ α-olefin, that has a density from 0.926 g/cc to 0.940 g/cc.

Melt temperature, or "$T_m$" as used herein (also referred to as a melting peak in reference to the shape of the plotted DSC curve) is typically measured by the DSC (Differential Scanning calorimetry) technique for measuring the melting points or peaks of polyolefins, as described in U.S. Pat. No. 5,783,638. It should be noted that many blends comprising two or more polyolefins will have more than one melting point or peak, many individual polyolefins will comprise only one melting point or peak.

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "olefin-based polymer" or "polyolefin" is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

A "sheath" is a generic term and when used in relation to cables, it includes insulation coverings or layers, protective jackets and the like.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ultra low density polyethylene resins (available form The Dow Chemical Company) and FLEXOMER™ very low density polyethylene resins (available from The Dow Chemical Company).

DETAILED DESCRIPTION

The present disclosure provides a conduit. In an embodiment, the conduit includes an annular wall composed of a polymeric material, the annular wall defining an annular passageway. The conduit also includes a plurality of channels extending along a length of an inner surface of the annular wall, and a slip material located in the channels. The slip material forms a capillary structure in the channels, and the capillary structures protrude radially inward from the annular wall.

In an embodiment, a coated conductor is disposed in the conduit.

A "conduit," as used herein, is an elongated tube-shaped structure having an annular wall. The annular wall defines an annular passageway extending through the conduit. The annular wall may or may not be a single-layer structure, or a multi-layer structure. FIG. 1 shows a conduit 60 with an annular wall 66 that defines an annular passageway 61. An article, such as a coated conductor, may extend through, or otherwise be disposed within, the annular passageway 61. The annular wall 66 has opposing surfaces—an outer surface 64 and an inner surface 62—as shown in FIG. 1.

The annular wall 66 is composed of a polymeric material. Nonlimiting examples of suitable polymeric materials include polyolefins (such as ethylene-based polymers and propylene-based polymers), polyvinyl chloride ("PVC"), and combinations thereof. In an embodiment, the polymeric material is an ethylene-based polymer, a propylene-based polymer, PVC, or combinations thereof.

In an embodiment, the polymeric material includes an ethylene-based polymer. Nonlimiting examples of suitable ethylene-based polymer (polyethylene) include low density polyethylene (LDPE) and linear polyethylene. Nonlimiting examples of suitable linear polyethylene include linear low density polyethylene (LLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear polyethylene, or linear polyethylene, ethylene-based plastomers/elastomers, medium density polyethylene (MDPE), and high density polyethylene (HDPE) and combinations thereof.

In an embodiment, the polymeric material is MDPE.

In an embodiment, the polymeric material is HDPE.

In an embodiment, the polymeric material includes a propylene-based polymer. Nonlimiting examples of suitable propylene-based polymers include propylene homopolymers, random propylene copolymers, propylene impact copolymers, propylene/α-olefin copolymers and combinations thereof.

In an embodiment, the polymeric material includes a propylene homopolymer.

In another embodiment, the polymeric material includes a propylene/α-olefin copolymer. Suitable α-olefins include, but are not limited to, $C_4$-$C_{20}$ α-olefins or $C_4$-$C_{10}$ α-olefins. Nonlimiting examples of suitable α-olefins include 1-butene, 1-pentene, 1-hexene, 1-heptene and 1-octene.

In an embodiment, the polymeric material includes polyvinyl chloride ("PVC").

The polymeric material may or may not include an additive. Nonlimiting examples of suitable additives include antioxidants, colorants, ultra violet (UV) absorbers or stabilizers, anti-blocking agents, flame retardants, compatibilizers, plasticizers, fillers, processing aids, crosslinking agents (e.g., peroxides), and combinations thereof.

In an embodiment, the polymeric material includes an antioxidant. Nonlimiting examples of suitable antioxidants include phenolic antioxidants, thio-based antioxidants, phosphate-based antioxidants, and hydrazine-based metal deactivators. In a further embodiment, the polymeric material includes an antioxidant, such as IRGANOX 1035, present in an amount from 0.1 wt %, or 0.2 wt % to 0.3 wt % based on the total weight of the polymeric material.

In an embodiment, the polymeric material includes a filler. Nonlimiting examples of suitable fillers include zinc oxide, zinc borate, zinc molybdate, zinc sulfide, clays such as organo-clay, carbon black, calcium carbonate, glass fiber, and combinations thereof. The filler may or may not have flame retardant properties.

In an embodiment, the polymeric material includes a processing aid. Nonlimiting examples of suitable processing aids include oils, organic acids (such as stearic acid), and metal salts of organic acids (such as zinc stearate).

The annular wall may comprise two or more embodiments disclosed herein.

1. Plurality of Channels

In FIG. 1, the conduit 10 includes a plurality of channels extending along a length, L, of the inner surface of the annular wall 66. The conduit 60 has a plurality of channels 68 extending along the length, L, of the inner surface 62 of the annular wall 66. A "channel" is an elongated void in the polymeric material of the annular wall 66. Each channel 68 is a small groove in the polymeric material, the channel extending along the length, L, of the inner surface 62 of the annular wall 66. When the annular wall 66 is a multi-layer structure, the inner surface 62 of the annular wall 66 is the inner surface of the innermost layer. The depth of the channels does not extend to the outer surface 64 of the annular wall 66. Each channel 68 is formed from a channel wall 69 that extends around the perimeter of the channel, from a cross-sectional view, as shown in FIGS. 3A-3D. The channel wall 69 is formed from the polymeric material that forms the annular wall 66.

Each channel 68 may extend along the entire length, L, of the inner surface 62 of the annular wall 66, or may extend along a portion of the length, L, of the inner surface 62 of the annular wall 66. In an embodiment, each channel 68 extends along the entire, or substantially the entire, length, L, of the inner surface 62 of the annular wall 66. In another embodiment, each channel 68 extends along a portion of the length L, of the inner surface 62 of the annular wall 66. In an embodiment, each channel 68 extends along from 50%, or 60%, or 70% to 80%, or 90%, or 95%, or 99%, or 100% of the length, L, of the of the inner surface 62 of the annular wall 66. The channels 68 may extend the length, L, of the inner surface 62 of the annular wall continuously or intermittently.

In an embodiment, the plurality of channels 68 extend along the length, L, of the inner surface 62 of the annular wall 66 in a pattern. Nonlimiting examples of suitable patterns include parallel, helical, sinusoidal and combinations thereof. In an embodiment, one or more channels 68 may intersect, or otherwise contact one another. In a further embodiment, the channels 68 intersect in a criss-cross pattern.

Figure 1A:
FIG. 1A is a cross-sectional view of the conduit taken along line 1A-1A of FIG. 1 in accordance with an embodiment of the present disclosure.

In an embodiment, the plurality of channels 68 extend along the length, L, of the inner surface 62 of the annular wall 66 in a parallel pattern. The term "parallel," as used herein, refers to channels extending in the same direction along the length, L, of the inner surface 62 of the annular wall 66, the channels maintaining a parallel orientation with respect to longitudinal axis, X, as shown in FIG. 1. The parallel channels to not intersect each other. FIGS. 1 and 1A depict parallel channels 68.

Figure 2:
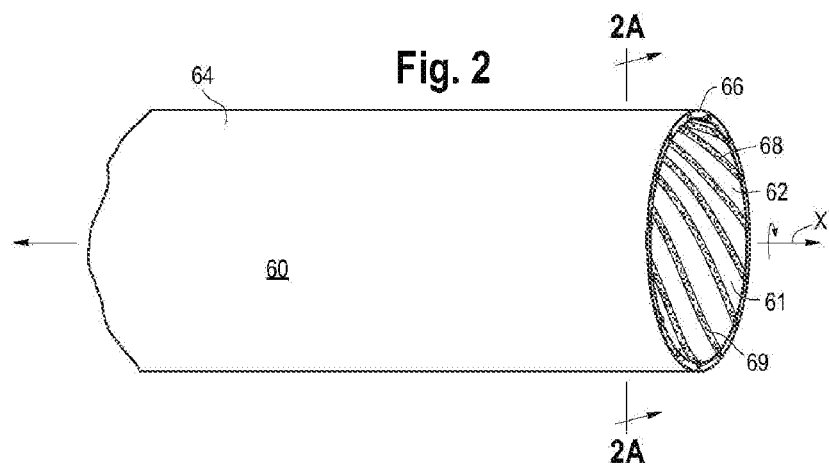
FIG. 2 is a perspective view of a conduit in accordance with another embodiment of the present disclosure.
Figure 2A:
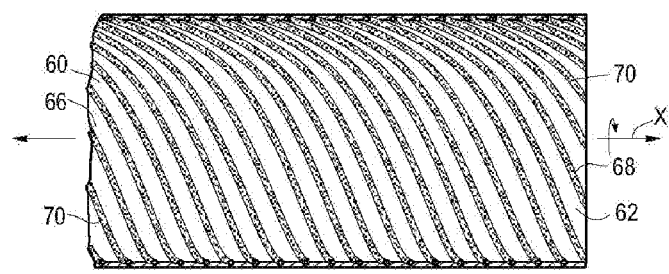
FIG. 2A is a cross-sectional view of the conduit taken along line 2A-2A of FIG. 2 in accordance with an embodiment of the present disclosure.

In an embodiment, the plurality of channels 68 extend along the length, L, of the inner surface 62 of the annular wall 66 in a helical pattern. The term "helical," as used herein, refers to channels extending in a spiral manner along the length, L, on and around the inner surface 62 of the annular wall 66, and not intersecting. FIGS. 2 and 2A depict helical channels 68.

In an embodiment, the plurality of channels 68 extend along the length, L, of the inner surface 62 of the annular wall 66 in a sinusoidal pattern (not shown). The term "sinusoidal," as used herein, refers to channels extending in a wave manner along the length, L, of the inner surface 62 of the annular wall 66. In a further embodiment, the sinusoidal pattern is composed of non-intersecting channels 68.

In an embodiment, one or more channels may intersect, or otherwise contact, one another. In a further embodiment, the channels intersect in a criss-cross pattern.

The channels 68 are arranged in a spaced-apart manner along the inner annular wall 62. In an embodiment, the channels 68 are each spaced an equal distance from one another.

In an embodiment, the conduit 60 includes from 2, or 3, or 4, or 5, or 6 to 7, or 8, or 9, or 10, or 11, or 12, or 13, or 14, or 15, or 16, or 18, or 20, or 30, or 40, or 50 channels 68. In another embodiment, the conduit 60 includes from 2, or 4 to 8, or 10, or 15, or 20, or 30, or 40, or 50 channels 68. In another embodiment, the conduit 60 includes at least 2 channels 68.

The plurality of channels may comprise two or more embodiments disclosed herein.

2. Slip Material

A slip material is located in each of the channels. A "slip material" is a composition that has a low Coefficient of Friction (COF). A "low Coefficient of Friction" is a COF of from 0.02 to 0.15. In an embodiment, the slip material has a COF of from 0.02, or 0.04, or 0.06, or 0.07, or 0.08, or 0.09, or 0.10 to 0.13, or 0.14, or 0.15.

Nonlimiting examples of suitable slip materials include silicone, fatty acid amides, plasticizers, organic amines, dibasic esters, stearates, sulfates, fatty acids, mineral oil, vegetable oils, fluorinated organic resins, graphite, tungsten disulfide, molybdenum disulfide, and combinations thereof. The slip material may or may not also include a polymeric material. The polymeric material may be any polymeric material disclosed herein. In an embodiment, the polymeric material is an ethylene-based polymer, a propylene-based polymer, a polyamide (such as nylon), or combinations thereof.

In an embodiment, the slip material is a silicone. A "silicone" is a polymer generally comprising siloxane-based monomer residue repeating units. A "siloxane" is a monomer residue repeat unit having the Structure (I):

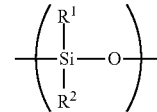

Structure (I)

wherein $R^1$ and $R^2$ each independently is hydrogen or a hydrocarbyl moiety. A "hydrocarbyl" is a univalent group formed by removing a hydrogen atom from a hydrocarbon (e.g., alkyl groups, such as ethyl, or aryl groups, such as phenyl). In an embodiment, the siloxane monomer residue can be any dialkyl, diaryl, dialkaryl, or diaralkyl siloxane, having the same or differing alkyl, aryl, alkaryl, or aralkyl moieties. In an embodiment, each of $R^1$ and $R^2$ is independently a $C_1$ to $C_{20}$, or $C_1$ to $C_{12}$, or $C_1$ to $C_6$ alkyl, aryl, alkaryl, or aralkyl moiety. In various embodiments, $R^1$ and $R^2$ can have the same or a different number of carbon atoms. In various embodiments, the hydrocarbyl group for each of $R^1$ and $R^2$ is an alkyl group that is saturated and optionally straight-chain. Additionally, the alkyl group in such embodiments can be the same for each of $R^1$ and $R^2$. Non-limiting examples of alkyl groups suitable for use in $R^1$ and $R^2$ include methyl, ethyl, 1-propyl, 2-propyl, 1-butyl, isobutyl, t-butyl, or combinations of two or more thereof. Nonlimiting examples of suitable silicone include polydimethylsiloxane (PDMS), poly(ethyl-methylsiloxane), and combinations thereof. Nonlimiting examples of suitable silicone also include the silicones disclosed in International Publication No. WO 2014/172105, the disclosure of which is incorporated by reference herein in its entirety.

In an embodiment, the slip material is a fatty acid amide. A "fatty acid amide" is a molecule having the Structure (II):

Structure (II)

wherein R is a $C_3$ to $C_{27}$ alkyl moiety. In an embodiment, R is a $C_{11}$ to $C_{25}$, or a $C_{15}$ to $C_{23}$ alkyl moiety. In another embodiment, R is a $C_{21}$ alkyl moiety. R can be saturated, mono-unsaturated, or poly-unsaturated. In an embodiment, R is mono-unsaturated. Nonlimiting examples of suitable fatty acid amides include erucamide, oleamide, palmitamide, stearamide, and behenamide. Additionally, the fatty acid amide can be a mixture of two or more fatty acid amides. In an embodiment, the fatty acid amide is erucamide. Nonlimiting examples of suitable fatty acid amides also include the fatty acid amides disclosed in International Publication No. WO 2014/172105.

In an embodiment, the slip material is a stearate. Nonlimiting examples of suitable stearates include zinc stearate, lead stearate, calcium stearate, and combinations thereof.

In an embodiment, the slip material is a sulfate. A nonlimiting example of a suitable sulfate is zinc sulfate.

In an embodiment, the slip material is a fatty acid. Nonlimiting examples of suitable fatty acids include palmitic acid, stearic acid, and combinations thereof.

In an embodiment, the slip material is a fluorinated organic resin. A "fluorinated organic resin" is a polymer of one or more fluorinated monomers selected from tetrafluoroethylene, vinylidene fluoride, and chlorotrifluoroethylene.

Nonlimiting examples of suitable commercially available slip materials include MB50-314 (which is a 50:50 masterbatch of an ultra-high molecular weight hydroxyl-terminated polydimethylsiloxane in an HDPE polymer) and MB50-002 (which is a 50:50 masterbatch of an ultra-high molecular weight siloxane polymer in a LDPE polymer), each available from Dow Corning Corporation, Midland, Mich., USA.

In an embodiment, the slip material includes from 10%, or 20%, or 30% to 40%, or 45%, or 50%, or 55%, or 60%, or 70%, or 75%, or 80%, or 90%, or 100 wt % silicone, fatty acid amides, plasticizers, organic amines, dibasic esters, stearates, sulfates, fatty acids, mineral oil, vegetable oils, fluorinated organic resins, graphite, tungsten disulfide, molybdenum disulfide, or combinations thereof, based on the total weight of slip material. In another embodiment, the slip material includes from 10%, or 20%, or 30% to 40%, or 45%, or 50%, or 55%, or 60%, or 70%, or 75%, or 80%, or 90%, or 99 wt % silicone, fatty acid amides, plasticizers, organic amines, dibasic esters, stearates, sulfates, fatty acids, mineral oil, vegetable oils, fluorinated organic resins, graphite, tungsten disulfide, molybdenum disulfide, or combinations thereof; and a reciprocal amount of a polymeric material, or from 1 wt %, or 10 wt %, or 20 wt %, or 25 wt %, or 30 wt %, or 40 wt %, or 54 wt %, or 50 wt %, or 55 wt %, or 60 wt % to 70 wt %, or 80 wt %, or 90 wt % polymeric material, based on the total weight of the slip material.

The slip material may or may not include additives. The additive may be any additive disclosed herein.

The slip material may comprise two or more embodiments disclosed herein.

3. Capillary Structure

The slip material forms a capillary structure in the channels. A "capillary structure" is a formation having a height, width, and depth and composed of the slip material. In other words, the capillary structure is a three-dimensional structure. Each capillary structure 70 protrudes radially inward from the annular wall 66, as shown in FIGS. 1, 2 and 3A-3D. A capillary structure that "protrudes radially inward from the annular wall" has a portion that extends inward beyond the inner surface of the annular wall. Alternatively, one or more of the capillary structures 70 may be co-extensive with the inner surface 62 of the annular wall 66.

The capillary structure 70 has a cross-sectional shape. Nonlimiting examples of suitable cross-sectional shapes for the capillary structure 70 includes an ellipse, a polygon, and combinations thereof.

Figure 3A:
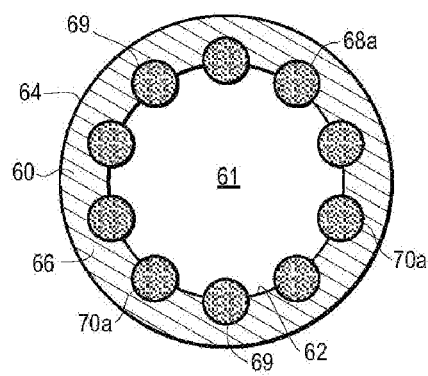
FIG. 3A is a cross-sectional view of a conduit in accordance with an embodiment of the present disclosure.
Figure 3B:
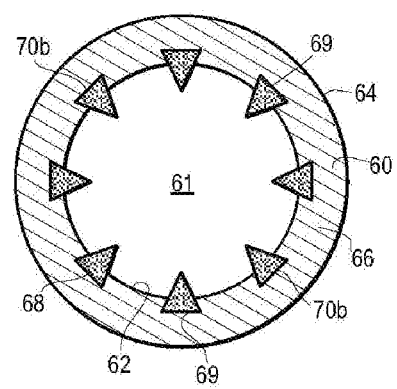
FIG. 3B is a cross-sectional view of a conduit in accordance with another embodiment of the present disclosure.
Figure 3C:
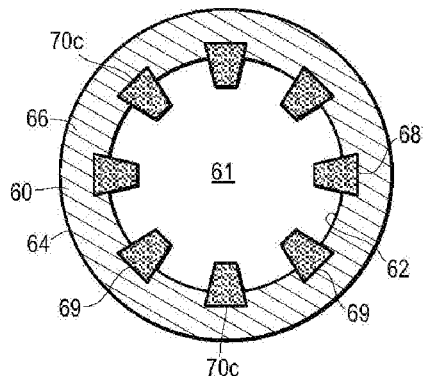
FIG. 3C is a cross-sectional view of a conduit in accordance with another embodiment of the present disclosure.
Figure 3D:
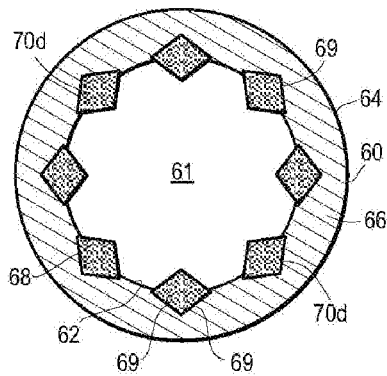
FIG. 3D is a cross-sectional view of a conduit in accordance with another embodiment of the present disclosure.

In an embodiment, the capillary structure 70 has a polygon cross-sectional shape. A "polygon" is a closed-plane figure bounded by at least three sides. The polygon can be a regular polygon, or an irregular polygon having three, four, five, six, seven, eight, nine, ten or more sides. Nonlimiting examples of suitable polygonal shapes include triangle, square, rectangle, diamond, trapezoid, parallelogram, hexagon and octagon. FIG. 3B depicts capillary structures 70b that have a triangle cross-sectional shape. FIG. 3C depicts capillary structures 70c that have a trapezoid cross-sectional shape. FIG. 3D depicts capillary structures 70d that have a diamond cross-sectional shape.

In an embodiment, the capillary structure 70 has an ellipse cross-sectional shape. An "ellipse" is a plane curve such that the sum of the distances of each point in its periphery from two fixed points, the foci, are equal. The ellipse has a center which is the midpoint of the line segment linking the two foci. The ellipse has a major axis (the longest diameter through the center). The minor axis is the shortest line through the center. The ellipse center is the intersection of the major axis and the minor axis. A "circle" is a specific form of ellipse, where the two focal points are in the same place (at the circle's center). Nonlimiting examples of ellipse shapes include circle, oval, and ovoid. FIG. 3A depicts capillary structures 70a that have a circle cross-sectional shape.

In an embodiment, the capillary structures 70 have a cross-sectional shape that is a circle, a triangle, a trapezoid, a diamond, and combinations thereof.

The channels 68 have a reciprocal cross-sectional shape compared to the cross-sectional shape of the capillary structures 70 (e.g., 70a, 70b, 70c, 70d), as shown in FIGS. 3A-3D. A channel having a "reciprocal cross-sectional shape" to that of a capillary structure has a configuration adapted to receive a portion of the capillary structure. For example, a channel 68a has a reciprocal cross-sectional shape that is an arc that mates with the circle cross-sectional shape of the capillary structure 70a, as shown in FIG. 3A. In an embodiment, the capillary structures 70 are anchored within the annular wall 66 such that the widest point of the cross-sectional shape of each capillary structure 70 is positioned within the annular wall 66. FIGS. 3A-3D show capillary structures 70 in which the widest point of the cross-sectional shape of each capillary structure 70 is positioned within the annular wall 66.

Each capillary structure 70 extends along the length of a respective channel 68. In an embodiment, the capillary structures 70 extend along all, or substantially all, of the length of the channels 68.

Each capillary structure 70 has a volume. The "volume" of a capillary structure is equal to the area of the cross-sectional shape of the capillary structure, multiplied by the length of the capillary structure. In an embodiment, from 5%, or 10%, or 15%, or 20%, or 25% to 30%, or 35%, or 40%, or 45%, or less than 50%, or 50% of the volume of each capillary structure 70 protrudes radially inward from the annular wall 66. In an embodiment, from 5%, or 10%, or 15%, or 20%, or 25% to 30%, or 35%, or 40%, or 45%, or less than 50%, or 50% of the volume of each capillary structure 70 protrudes radially inward from the annular wall 66, and a reciprocal amount, or from 50%, or less than 50%, or 55%, or 60%, or 65%, or 70% to 75%, or 80%, or 85%, or 90%, or 95% of the volume of each capillary structure 70 is positioned within the channel 68 of the annular wall 66.

The number of capillary structures 70 equals, or otherwise corresponds to, the number of channels 68. In an embodiment, the conduit 60 includes from 2, or 3, or 4, or 5, or 6 to 7, or 8, or 9, or 10, or 11, or 12, or 13, or 14, or 15, or 16, or 18, or 20, or 30, or 40, or 50 capillary structures 70. In another embodiment, the conduit 60 includes from 2, or 4 to 8, or 10, or 15, or 20, or 30, or 40, or 50 capillary structures 70. In another embodiment, the conduit 60 includes at least 2 capillary structures 70.

In an embodiment, each capillary structure 70 is adhered to a respective channel 68. Each capillary structure adheres to its respective channel by way of co-extrusion alone, or in combination with, the mated structural pairing of the capillary structure cross-sectional shape to the reciprocal cross-sectional shape of the channel.

In an embodiment, the annular wall 66 and the slip material are co-extruded, as discussed below.

In an embodiment, each capillary structure 70 formed from a slip material is also coated with a slip material (hereinafter "slip coating"). The slip coating may be any slip material disclosed herein. The slip coating may be the same material as the slip material, or a different material than the slip material.

The capillary structures may comprise two or more embodiments disclosed herein.

In an embodiment, the conduit 60 includes:

(i) an annular wall 66 composed of a polymeric material that is an ethylene-based polymer (such as MDPE), a propylene-based polymer, PVC, or combinations thereof, the annular wall 66 defining an annular passageway 61;

(ii) from 2, or 3, or 4, or 5, or 6 to 7, or 8, or 9, or 10, or 11, or 12, or 13, or 14, or 15, or 16, or 18, or 20, or 30, or 40, or 50 channels 68 extending along a length, L, of an inner surface 62 of the annular wall 66; and (iii) a slip material that is a silicone, a fatty acid amide, a plasticizer, an organic amine, a dibasic ester, a stearate, a sulfate, a fatty acid, a mineral oil, a vegetable oil, fluorinated organic resin, graphite, tungsten disulfide, molybdenum disulfide, or combinations thereof, the slip material located in the channels 68 and forming a capillary structure 70 in the channels 68, wherein the capillary structures 70 protrude radially inward from the annular wall 66. In an embodiment, the capillary structures 70 have a cross-sectional shape that is an ellipse, a polygon, or combinations thereof. In another embodiment, from 5%, or 10%, or 15%, or 20%, or 25% to 30%, or 35%, or 40%, or 45%, or less than 50%, or 50% of the volume of each capillary structure 70 protrudes radially inward from the annular wall 66. In an embodiment, the slip material also includes a polymeric material, such as an ethylene-based polymer (e.g., LDPE).

In an embodiment, the conduit 60 includes:

(i) an annular wall 66 composed of MDPE, the annular wall 66 defining an annular passageway 61;

(ii) from 2, or 4 to 8, or 10, or 15, or 20 channels 68 extending along a length, L, of an inner surface 62 of the annular wall 66; and (iii) a slip material containing a silicone and LDPE located in the channels 68, the slip material forming a capillary structure 70 in the channels 68, wherein the capillary structures 70 protrude radially inward from the annular wall 66. In an embodiment, the capillary structures 70 have a cross-sectional shape that is a circle, a triangle, a trapezoid, a diamond, or combinations thereof. In another embodiment, from 5%, or 10%, or 15%, or 20%, or 25% to 30%, or 35%, or 40%, or 45%, or less than 50%, or 50% of the volume of each capillary structure 70 protrudes radially inward from the annular wall 66.

In an embodiment, the conduit 60 has a thickness from 1 mm, or 2 mm to 3 mm, or 5 mm, or 10 mm, or 15 mm, or 20 mm, or 25 mm, or 30 mm.

The conduit may comprise two or more embodiments disclosed herein.

Figure 4:
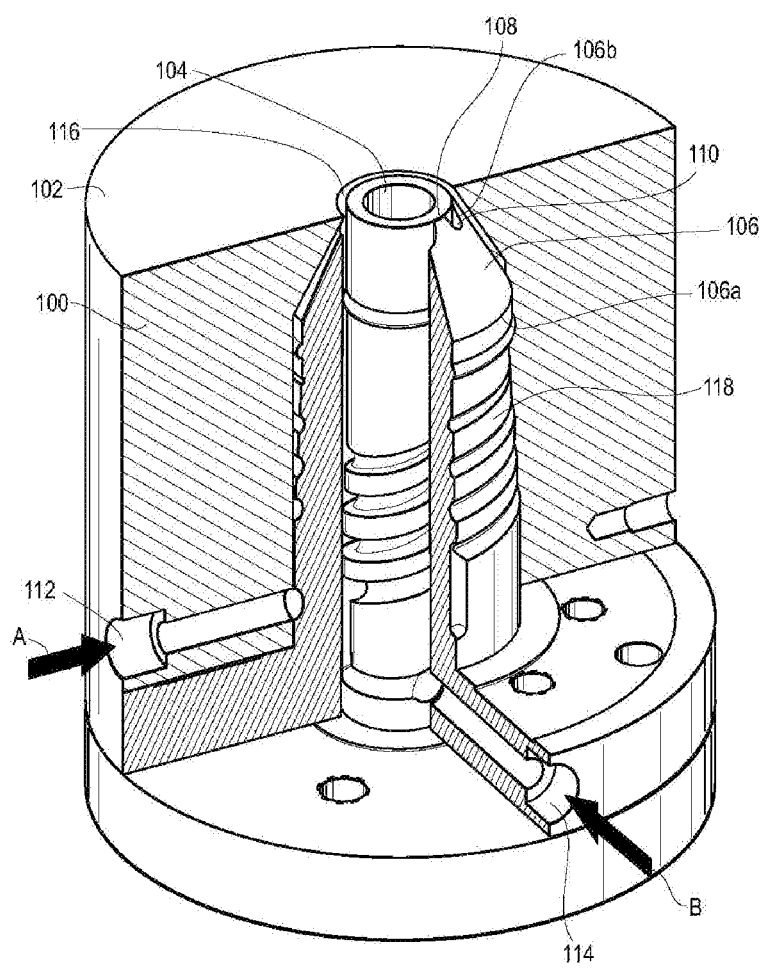
FIG. 4 is a perspective cut-away view of a die assembly for manufacturing a conduit in accordance with an embodiment of the present disclosure.

In an embodiment, conduit 60 is produced via co-extrusion of the polymeric material and the slip material using a spiral wound or cross-head mandrel assembly, such as the spiral wound mandrel assembly depicted in FIG. 4. FIG. 4 depicts a mandrel assembly 100 provided with features to facilitate the creation of channels in a conduit annular wall. The mandrel assembly 100 includes a housing 102, a cone-shaped tip 106, a polymeric material inlet 112, and a slip material inlet 114. The housing 102 includes (i) a housing tubular channel 104 extending along the length of the housing, and the longitudinal centerline axis of the housing 102; (ii) a fluid annular channel 116 encircling the housing tubular channel 104; and (iii) a fluid ring 118 in fluid communication with the fluid annular channel 116, the fluid ring 118 positioned at one end of the housing. The cone-shaped tip 106 has a wide end 106a and a narrow end 106b. The wide end 106a of the tip 106 is attached to the end of the housing 102 at which the fluid ring 118 is positioned. The tip 106 includes a tip tubular channel 108 extending along the length of the tip 106 and the longitudinal centerline axis of the tip 106. The tip 106 also includes a plurality of tip fluid channels 110, wherein each tip fluid channel 110 is in fluid communication with the fluid ring 118. The tip 106 has a nozzle (not shown) in fluid communication with the tip fluid channels 110, the nozzle located at the end and extending beyond the narrow end 106b of the tip 106. The housing tubular channel 104 and the tip tubular channel 108 are in open communication with one another. A polymeric material inlet 112 is in fluid communication with the fluid annular channel 116 such that polymeric material fed in to the mandrel assembly, depicted as Arrow A in FIG. 4, flows into the fluid annular channel 116. The polymeric material flows through the fluid annular channel 116 until it flows around the nozzle and forms an annular wall. The slip material inlet 114 is in fluid communication with the plurality of tip fluid channels 110 such that slip material fed into the mandrel assembly, depicted as Arrow B in FIG. 4, flows into the tip fluid channels 110. The slip material exits the tip fluid channels 110 through the nozzle into the polymeric material as the polymeric material forms the annular wall 66.

Because the nozzles extend beyond the end of the cone of the tip 106, the slip material from the nozzle enters the polymeric material and as the polymeric material and slip material solidify, (i) forms channels in the annular wall and (ii) forms capillary structures from the slip material.

In an embodiment, the process for producing a coated conductor includes (i) heating the polymeric material to at least the melting temperature of the polymeric material, (ii) heating the slip material to at least the melting temperature of the slip material, (iii) and then co-extruding the polymeric material and the slip material to form an annular wall with channels, the channels containing capillary structures formed from the slip material. The polymeric material and the slip material each is in an extrudable state.

In an embodiment, the process for producing the present conduit utilizes the process for producing a cable jacket as disclosed in U.S. Provisional Patent Application No. 62/427,358, filed 29 Nov. 2016, the disclosure of which is incorporated by reference herein in its entirety.

4. Coated Conductor Disposed in a Conduit

Figure 5:
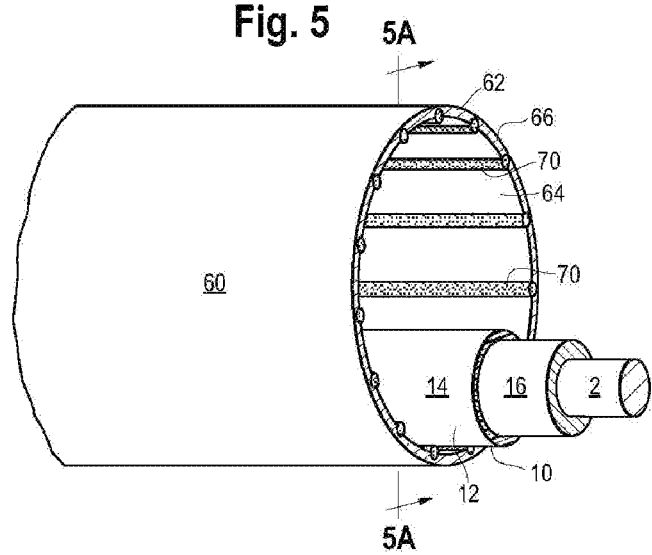
FIG. 5 is a perspective view of a coated conductor within a conduit in accordance with an embodiment of the present disclosure.
Figure 5A:
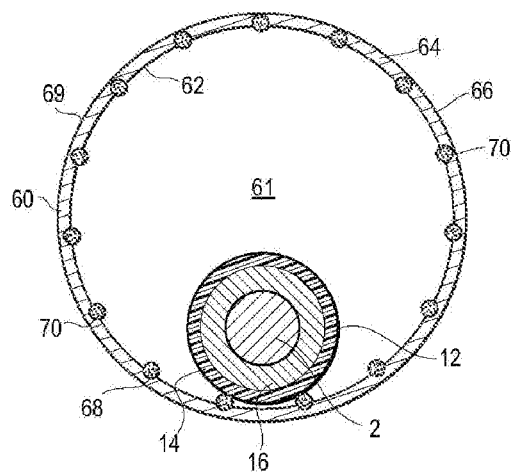
FIG. 5A is a cross-sectional view of the coated conductor within a conduit taken along line 5A-5A of FIG. 5 in accordance with an embodiment of the present disclosure.

In an embodiment, a coated conductor is disposed in the conduit. FIGS. 5 and 5A depict a coated conductor 10 in the conduit 60.

In an embodiment, the coated conductor 10 includes a conductor 2 and a coating on the conductor. The coating is located on the conductor. The coating may wholly or partially cover or otherwise surround or encase the conductor. The coating may be the sole component surrounding the conductor. Alternatively, the coating may be one layer of a multilayer jacket or sheath encasing the metal conductor. In an embodiment, the coating directly contacts the conductor. In another embodiment, the coating directly contacts an insulation layer surrounding the conductor.

In an embodiment, the coating is an outermost jacket 14 for a conductor. FIGS. 5 and 5A depict a coated conductor 10 with a jacket 14 for a conductor 2. The coated conductor 10 includes an insulation layer 16 between the conductor 2 and the jacket 14. The jacket 14 directly contacts the insulation layer 16, which surrounds the conductor 2.

The coating is formed from a polymeric material. The polymeric material may be any polymeric material previously disclosed herein.

In an embodiment, the coated conductor 10 includes a slip material on the outer surface 12 of the coated conductor 10.

In an embodiment, the coated conductor is a coated conductor having capillary structures composed of slip material, the capillary structures protruding radially outward from the coating as disclosed in U.S. Provisional Patent Application Ser. No. 62/452,719, filed on 31 Jan. 2017, the disclosure of which is incorporated by reference herein in its entirety.

In an embodiment, the coated conductor includes:
a conductor; and
a coating on the conductor, the coating having:
(i) an annular wall composed of a polymeric material, the annular wall surrounding at least a portion of the conductor;
(ii) a plurality of channels extending along a length of an outer surface of the annular wall; and
(iii) a slip material located in the channels, the slip material forming a capillary structure in the channels, and the capillary structures protruding radially outward from the annular wall.

The polymeric material may be any polymeric material previously disclosed herein. The slip material may be any slip material previously disclosed herein.

In an embodiment, the coated conductor is a fiber optic cable, a communications cable (such as a telephone cable or a local area network (LAN) cable), a power cable, wiring for consumer electronics, a power charger wire for cell phones and/or computers, computer data cords, power cords, appliance wiring material, home interior wiring material, and consumer electronic accessory cords.

In an embodiment, at least one of the capillary structures 70 of the conduit 60 is in direct contact with the outer surface 12 of the coated conductor 10. In another embodiment, at least two of the capillary structures 70 of the conduit 60 are in direct contact with the outer surface 12 of the coated conductor 10. FIG. 5A depicts a coated conductor 10 disposed in the conduit 60, wherein two of the capillary structures 70 are in direct contact with the outer surface 12 of the coated conductor 10.

The outer surface 12 of the coated conductor may or may not be in contact with the inner surface 62 of the conduit 60. In an embodiment, the outer surface 12 of the coated conductor 10 is not in contact with the inner surface 62 of the conduit 60. The radially protruding capillary structures prevent the inner surface 62 of the conduit 60 from contacting the outer surface 12 of the coated conductor 10.

Bounded by no particular theory, it is believed that capillary structures 70 formed from low COF slip material that protrude radially inward from the annular wall 66 reduce the tension that arises as a coated conductor 10 is pulled into and through a conduit 60. The capillary structures 70 reduce the surface area of the annular wall 66 that comes into contact with the coated conductor 10. In this way, the low COF slip material is in contact with the coated conductor. Tension, or friction, is reduced by (i) minimizing the contact surface area between the coated conductor and the conduit and (ii) the lubricating effect provided by the capillary structures made of low COF slip material. Reduced tension, or friction, improves the ease of installation of coated conductors, reduces the installation time of coated conductors through conduits, and results in less damage to coated conductors and conduits during installation.

Bounded by no particular theory, it is also believed that forming capillary structures 70 from low COF slip material uses a lower load of slip material than comparative conduits in which (i) the slip material is blended with the polymeric material to form the annular wall, and (ii) annular wall is coated, such as sprayed, with the slip material. Lower loads of low COF slip material are advantageous because low COF slip materials are expensive. Furthermore, capillary structures 70 that are anchored within the annular wall 66 avoids the need for a tie layer to bond the polymeric material to the slip material.

The conduit may comprise two or more embodiments disclosed herein.

By way of example, and not limitation, examples of the present disclosure are provided.

EXAMPLE

The conduit 60 of FIG. 1 is produced via co-extrusion using the mandrel assembly depicted in FIG. 4. The conduit 60 has an annular wall 66 composed of a polymeric material that is a MDPE. The annular wall 66 defines an annular passageway 61. Fifteen channels 68 extend along the length of the inner surface 62 of the annular wall 66. The channels 68 extend along the length of the inner surface 62 of the annular wall 66 in a parallel pattern. A slip material that is MB50-002 (which is a 50:50 masterbatch of an ultra-high molecular weight siloxane polymer in a LDPE polymer, available from Dow Corning Corporation, Midland, Mich., USA) is co-extruded in the channels 68. The slip material forms capillary structures 70 in the channels 68. The capillary structures 70 have a circle cross-sectional shape 70*a*, as shown in FIGS. 1 and 3A. The capillary structures 70 protrude radially inward from the annular wall 66. From 5% to 50% of the volume of each capillary structure 70 protrudes radially inward from the inner surface 62 of the annular wall 66.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A conduit comprising:
   (i) an annular wall composed of a polymeric material, the annular wall defining an annular passageway;
   (ii) a plurality of channels extending along a length of an inner surface of the annular wall; and
   (iii) a slip material located in the channels, the slip material forming a capillary structure in the channels, and the capillary structures protruding radially inward from the annular wall, wherein the slip material is selected from the group consisting of a silicone, a fatty acid amide, a plasticizer, an organic amine, a dibasic ester, a stearate, a sulfate, a fatty acid, a mineral oil, a vegetable oil, and combinations thereof.

2. The conduit of claim 1 wherein each capillary structure is adhered to a channel.

3. The conduit of claim 1 wherein the annular wall and the slip material are co-extruded.

4. The conduit of claim 1 wherein the channels extend in a pattern along the length of the inner surface of the annular wall, the pattern selected from a parallel pattern, a helical pattern, a sinusoidal pattern, or combinations thereof.

5. The conduit of claim 1 wherein each capillary structure has a cross-sectional shape selected from the group consisting of an ellipse and a polygon.

6. The conduit of claim 1 wherein the conduit comprises from 2 to 20 channels.

7. The conduit of claim 1 wherein each capillary structure has a volume, and from 5% to 50% of the volume of each capillary structure protrudes radially inward from the annular wall.

8. The conduit of claim 1 wherein the slip material comprises a silicone.

9. The conduit of claim 1 wherein the slip material further comprises an ethylene-based polymer.

10. The conduit of claim 1 wherein the polymeric material is selected from the group consisting of an ethylene-based polymer, a propylene-based polymer, polyvinyl chloride (PVC), and combinations thereof.

11. The conduit of claim 1 wherein each capillary structure has a volume, and from 5% to 50% of the volume of each capillary structure protrudes radially inward from the annular wall; and
    the polymeric material comprises a medium density polyethylene (MDPE); and the slip material comprises a silicone and a low density polyethylene (LDPE).

12. The conduit of claim 1, wherein a coated conductor is disposed in the conduit.

13. The conduit of claim 12 wherein at least one of the capillary structures is in direct contact with the coated conductor.

14. The conduit of claim 12 wherein the coated conductor comprises:
    a conductor; and
    a coating on the conductor, the coating comprising
    (i) an annular wall composed of a polymeric material, the annular wall surrounding at least a portion of the conductor;
    (ii) a plurality of channels extending along a length of an outer surface of the annular wall; and
    (iii) a slip material located in the channels, the slip material forming a capillary structure in the channels, and the capillary structures protruding radially outward from the annular wall.

* * * * *